(12) United States Patent
Imai et al.

(10) Patent No.: US 10,054,215 B2
(45) Date of Patent: Aug. 21, 2018

(54) HYDRAULIC CIRCUIT FOR CONTROLLING CONTINUOUSLY VARIABLE TRANSMISSION

(71) Applicant: KAWASAKI JUKOGYO KABUSHIKI KAISHA, Kobe-shi, Hyogo (JP)

(72) Inventors: Hideyuki Imai, Akashi (JP); Kenichiro Tanaka, Kobe (JP); Tatsuhiko Goi, Kobe (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 429 days.

(21) Appl. No.: 14/988,369

(22) Filed: Jan. 5, 2016

(65) Prior Publication Data
US 2016/0131245 A1 May 12, 2016

Related U.S. Application Data

(63) Continuation of application No. PCT/JP2014/062579, filed on May 12, 2014.

(30) Foreign Application Priority Data

Jul. 10, 2013 (JP) .................. 2013-144235

(51) Int. Cl.
*F16H 61/00* (2006.01)
*F16H 57/04* (2010.01)

(52) U.S. Cl.
CPC ..... *F16H 57/0446* (2013.01); *F16H 57/0434* (2013.01); *F16H 57/0476* (2013.01);
(Continued)

(58) Field of Classification Search
CPC ............ F16H 57/0446; F16H 57/0434; F16H 57/0476; F16H 61/0025; F16H 2061/0037
See application file for complete search history.

(56) References Cited

U.S. PATENT DOCUMENTS 3,280,646 A * 10/1966 Lemieux ............. F16H 61/6648
476/2
3,440,895 A * 4/1969 Fellows ................ F16H 61/664
476/10
(Continued)

FOREIGN PATENT DOCUMENTS

EP 2441985 A2 4/2012
JP 2009270649 A 11/2009
(Continued)

OTHER PUBLICATIONS

Notification of Reason(s) for Rejection of Japanese Patent Application No. 2013-144235 dated Feb. 25, 2014.
(Continued)

*Primary Examiner* — David M Fenstermacher
(74) *Attorney, Agent, or Firm* — Sughrue Mion, PLLC

(57) ABSTRACT

A hydraulic circuit for controlling a continuously variable transmission includes: a lubrication line provided with a lubrication pump, and configured to supply oil from an oil tank to a lubrication target by using the lubrication pump; a high pressure line provided with a high pressure pump, branching from the lubrication line, and configured to supply, by using the high pressure pump, high-pressure oil to a hydraulic control section that controls oil pressure of the oil to be supplied to the continuously variable transmission; and a cooling return line branching from the high pressure line, and configured to return the oil to a downstream side of the lubrication pump in the lubrication line, a portion of the
(Continued)

cooling return line forming a cooling path to cool a generator connected to the continuously variable transmission.

5 Claims, 3 Drawing Sheets

(52) U.S. Cl.
CPC ..... *F16H 57/0487* (2013.01); *F16H 61/0025* (2013.01); *F16H 2061/0037* (2013.01)

(56) References Cited

U.S. PATENT DOCUMENTS

| | | | | |
|---|---|---|---|---|
| 4,056,989 A * | 11/1977 | Shaffer | ............ | F16H 15/38 476/10 |
| 4,501,172 A * | 2/1985 | Kraus | ............ | F16H 59/40 476/10 |
| 4,830,578 A * | 5/1989 | Kraus | ............ | F16H 61/6646 417/223 |
| 5,980,421 A * | 11/1999 | Machida | ............ | F16H 61/664 476/10 |
| 6,080,079 A * | 6/2000 | Sakai | ............ | F16H 15/38 476/10 |
| 7,503,869 B2 * | 3/2009 | Nishizawa | ............ | F16H 61/6648 476/10 |
| 7,625,309 B2 * | 12/2009 | Fuller | ............ | F16H 37/086 476/10 |
| 8,033,952 B2 * | 10/2011 | Fuchs | ............ | F16H 61/6649 476/10 |
| 8,512,008 B2 | 8/2013 | Park et al. | | |
| 8,852,049 B2 * | 10/2014 | Long | ............ | F16H 61/0206 476/10 |
| 2010/0197447 A1 * | 8/2010 | Donohoe | ............ | F16H 61/6648 476/2 |
| 2012/0085441 A1 | 4/2012 | Park et al. | | |
| 2012/0202642 A1 * | 8/2012 | Long | ............ | F16H 61/6648 476/3 |

FOREIGN PATENT DOCUMENTS

| | | |
|---|---|---|
| JP | 4402067 B | 1/2010 |
| JP | 2010-168825 A | 8/2010 |
| JP | 2011-064274 A | 3/2011 |
| JP | 2012-082947 A | 4/2012 |

OTHER PUBLICATIONS

Decision of Grant of Japanese Patent Application No. 2013-144235 dated Sep. 24, 2014.
International Search Report of PCT/JP2014/062579 dated Jun. 24, 2014.
International Preliminary Report on Patentability issued from the International Bureau in counterpart international application No. PCT/JP2014/062579, dated Jan. 21, 2016.
Communication dated Aug. 14, 2017, from the European Patent Office in counterpart European application No. 14823495.8.
Communication dated Jan. 30, 2017 issued by the Canadian Intellectual Property Office in counterpart application No. 2,916,925.

* cited by examiner

HYDRAULIC CIRCUIT FOR CONTROLLING CONTINUOUSLY VARIABLE TRANSMISSION

CROSS REFERENCE TO THE RELATED APPLICATION

This application is a continuation application, under 35 U.S.C. § 111(a), of international application No. PCT/JP2014/062579, filed May 12, 2014, which claims priority to Japanese patent application No. 2013-144235, filed Jul. 10, 2013, the disclosure of which are incorporated by reference in their entirety into this application.

BACKGROUND OF THE INVENTION

Field of the Invention

The present invention relates to hydraulic circuits used for controlling drive of continuously variable transmissions.

Description of Related Art

As an electric power generating device for an aircraft, it is known to use a constant frequency generator (IDG) which operates while keeping a rotation rate (frequency) thereof constant even when a rotation rate of an aircraft engine, which is a drive source, varies. As a transmission for keeping the rotation rate of the generator constant in the IDG, a continuously variable transmission has been used.

The continuously variable transmission is controlled by hydraulic pressure. If a hydraulic circuit is not supplied with a sufficient amount of oil when gravitational acceleration of a flying aircraft changes from positive to negative (or vice versa), operation of the continuously variable transmission may become unstable. In order to avoid such a situation, it has been proposed to provide an oil return line for returning a predetermined amount of oil to an upstream side of an oil supply pipe, thereby to compensate for shortage of oil, and cause the continuously variable transmission to stably operate (refer to Patent Document 1, for example).

RELATED DOCUMENT

Patent Document

[Patent Document 1] JP Patent No. 4402067

SUMMARY OF THE INVENTION

The above-mentioned hydraulic circuit allows the continuously variable transmission to stably operate, but since excessive oil is continuously returned by the oil return line, a hydraulic pump performs useless work that does not contribute to power generation, which may cause reduction in efficiency of the IDG.

In order to solve the above-mentioned problem, an object of the present invention is to provide a hydraulic circuit that allows an increase in efficiency of an IDG while maintaining stable operation of a continuously variable transmission by supplying a sufficient amount of oil.

In order to achieve the above-described object, a hydraulic circuit according to the present invention is used for control of a continuously variable transmission, and includes: a lubrication line provided with a lubrication pump, and configured to supply oil from an oil tank to a lubrication target by using the lubrication pump; a high pressure line provided with a high pressure pump, branching from the lubrication line, and configured to supply, by using the high pressure pump, high-pressure oil to a hydraulic control section that controls oil pressure of the oil to be supplied to the continuously variable transmission; and a cooling return line branching from the high pressure line, and configured to return the oil to a downstream side of the lubrication pump in the lubrication line, a portion of the cooling return line forming a cooling path to cool a generator connected to the continuously variable transmission.

According to this configuration, the line for returning the oil to the lubrication line is used, as a cooling return line, also for cooling the generator, and thereafter, the oil is returned to the downstream side of the lubrication pump, whereby the total amount of required oil is reduced, and thus the pump capacity is reduced. Moreover, since the generator is cooled by using the oil in the high pressure line, the pressure loss of the lubrication line is reduced as compared to the case of cooling the generator with the oil in the low-pressure lubrication line, and thus useless work of the lubrication pump is reduced. Therefore, the efficiency of the IDG is significantly increased.

In one embodiment of the present invention, the portion of the cooling return line preferably forms a cooling path to cool a stator of the generator. According to this configuration, with a simple structure in which the cooling return line passes near the outer peripheral surface of the generator in which the stator is located, the amount of required oil can be reduced as described above, and thus the efficiency of the IDG can be increased.

In one embodiment of the present invention, another portion of the cooling return line preferably forms a cooling path to cool a rotor of the generator. According to this configuration, the oil in the cooling return line is used for cooling not only the stator of the generator but also the rotor thereof. Therefore, further reduction in the oil amount is achieved, and thus the efficiency of the IDG can be further increased.

In one embodiment of the present invention, the cooling return line is preferably connected to the lubrication line on an upstream side of an oil cooler. According to this configuration, the generator can be efficiently cooled by reusing the oil returned from the cooling return line.

In one embodiment of the present invention, an auxiliary tank for compensating for shortage of the oil amount in the high pressure line is preferably provided on an upstream side of the high pressure pump in the high pressure line. According to this configuration, shortage of the oil required for control of the continuously variable transmission is assuredly avoided, whereby the continuously variable transmission can be stably operated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
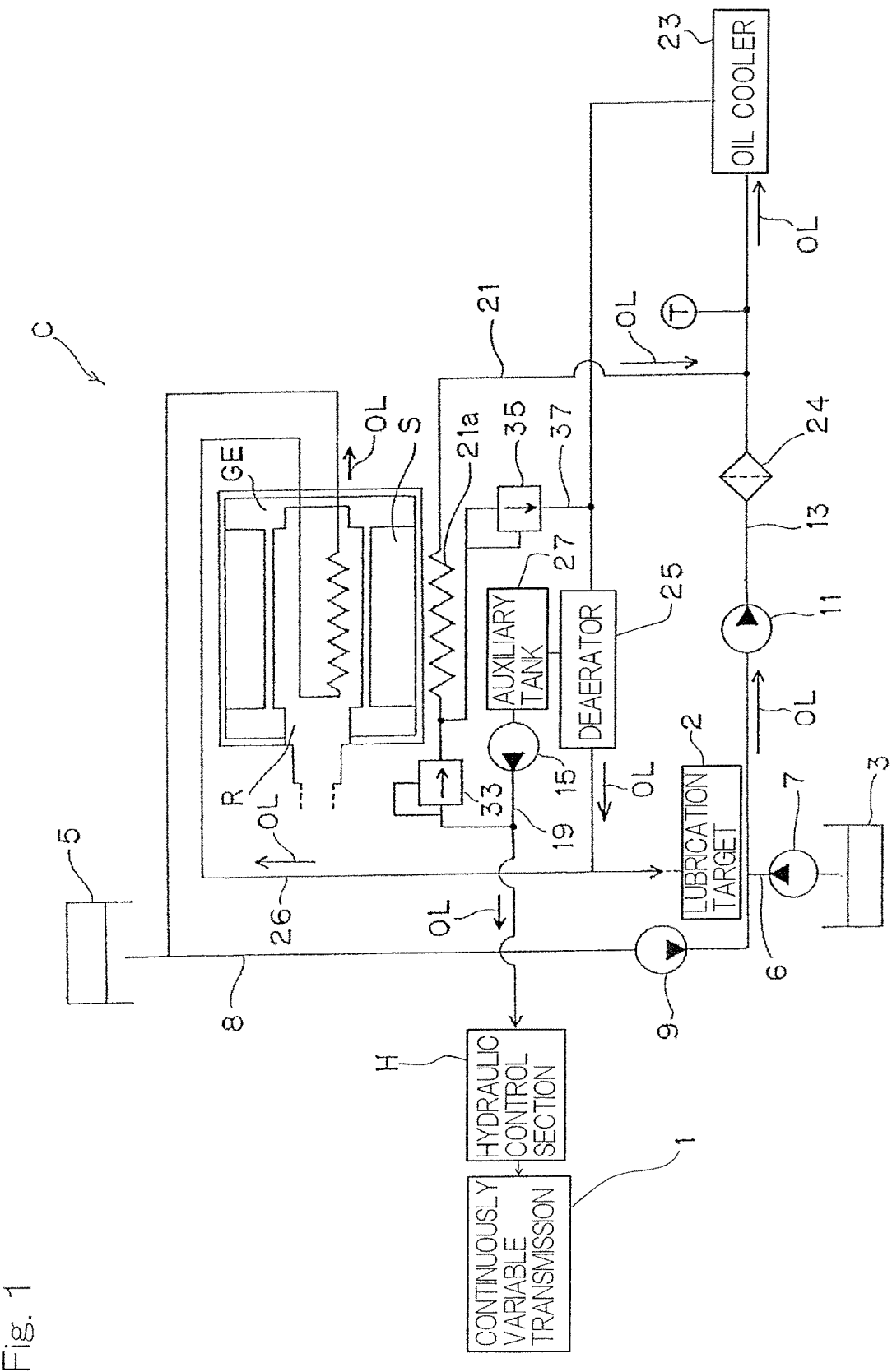
FIG. 1 is a block diagram showing a schematic configuration of a hydraulic circuit according to a first embodiment of the present invention.

Hereinafter, embodiments of the present invention will be described with reference to the drawings. FIG. 1 is a block diagram showing a hydraulic circuit C according to one embodiment of the present invention. The hydraulic circuit C is a circuit for controlling drive of a continuously variable transmission 1 used in, for example, a constant frequency generator (IDG) for an aircraft.

The hydraulic circuit C is provided with a first main tank 3 and a second main tank 5 as oil tanks for supplying oil OL for lubricating a lubrication target 2 such as bearings and gears. The first main tank 3 is located in a lower portion of a housing. In a normal state (a state where gravitational acceleration is positive), the first main tank 3 supplies the oil OL through a first scavenging pump 7 provided in a first supply path 6. The second main tank 5 is located in an upper portion of the housing. In a negative G state (a state where gravitational acceleration is negative), the second main tank 5 supplies the oil OL through a second scavenging pump 9 provided in a second supply path 8. Although the structure and operation of the hydraulic circuit C in the normal state will be mainly described below as a typical example, the hydraulic circuit C operates similarly also in the negative G state, unless expressly described otherwise.

The hydraulic circuit C includes a lubrication line 13, a high pressure line 19, and a cooling return line 21. The lubrication line 13 is provided with a lubrication pump 11, and supplies the oil OL from the first main tank 3 to the lubrication target 2 with the lubrication pump 11. The high pressure line 19 branches from the lubrication line 13. The high pressure line 19 supplies the high-pressure oil OL, with the high pressure pump 15 provided in the high pressure line 19, to a hydraulic control section H that controls the oil pressure of the oil to be supplied to the continuously variable transmission 1. The cooling return line 21 branches from the high pressure line 19, and returns the oil OL to the lubrication line 13.

In the lubrication line 13, the lubrication pump 11 is provided downstream of an inflow point from the first supply path 6. An oil cooler 23 is provided further downstream of the lubrication pump 11 in the lubrication line 13. A filter 24 for removing foreign matter in the oil is provided between the lubrication pump 11 and the oil cooler 23. A deaerator 25 is provided downstream of the oil cooler 23 in the lubrication line 13. The oil OL flowing from the first supply path 6 into the lubrication line 13 is cooled by the oil cooler 23, and subsequently flows into the deaerator 25. The deaerator 25 is a device for removing air from the oil. In the present embodiment, particularly in a gravity-free state that occurs in a transitional period from the normal state to the negative G state or in a transitional period from the negative G state to the normal state, the air sucked by the first scavenging pump 7 and mixed into the oil OL is removed from the oil OL by means of the deaerator 25.

Figure 2:
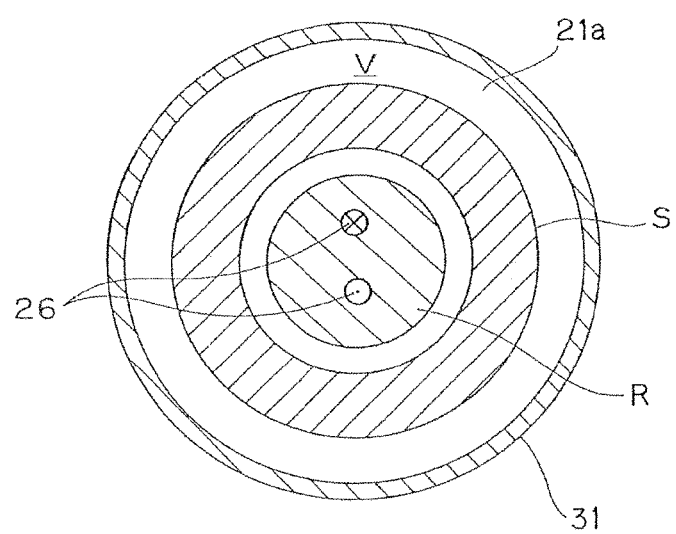
FIG. 2 is a transverse cross-sectional view schematically showing an internal structure of a generator shown in FIG. 1.

A portion of the oil OL that has passed through the deaerator 25 is supplied to the lubrication target 2, and the remaining portion of the oil OL passes through a rotor cooling line 26 branching from the lubrication line 13 and cools a rotor R of the generator GE. In the present embodiment, as shown in FIG. 2, the rotor cooling line 26 passes through the inside of the rotor R. In this example, the rotor cooling line 26 has an oil inflow path portion extending, in the rotor R, substantially in parallel to a rotation axis of the rotor R, and an outflow path portion returning from the inflow path portion and extending, in the rotor R, substantially in parallel to the rotation axis of the rotor R. However, the rotor cooling line 26 may have any route and/or shape as long as the rotor R is cooled by the oil flowing in the rotor cooling line 26. For example, the rotor cooling line 26 may be provided so as to pass in the periphery of the rotor R. That is, in the example shown in FIG. 2, the rotor cooling line 26 may be provided so as to pass through a space between the rotor R and a stator S.

The high pressure line 19 is provided so as to branch from the downstream side of the oil cooler 23 in the lubrication line 13. In the present embodiment, the high pressure line 19 branches from the deaerator 25, and the oil OL is fed to the hydraulic control section H with the high pressure pump 15 provided downstream of the deaerator 25. An auxiliary tank 27 for compensating for shortage of the oil amount in the high pressure line 19 is provided between the deaerator 25 and the high pressure pump 15.

The cooling return line 21 branches from the downstream side of the high pressure pump 15 in the high pressure line 19, passes in the periphery of the stator S of the generator GE, and then is connected to a portion of the lubrication line 13 between the lubrication pump 11 and the oil cooler 23, that is, a portion downstream of the lubrication pump 11 and upstream of the oil cooler 23. As shown in FIG. 2, the generator GE includes the stator S having a wound coil housed in a cylindrical outer case 31, and the rotor R disposed inside the stator S and including a magnet. A space V in the periphery of the stator S of the generator GE, that is, between the outer case 31 and the stator S in the shown example, forms a portion of the cooling return line 21 shown in FIG. 1. In other words, the portion of the cooling return line 21 forms a stator cooling portion 21a which is a cooling path to cool the stator S of the generator GE. The stator cooling portion 21a as the cooling path for the stator S may have any route and/or shape as long as the stator S is cooled by the oil flowing in the stator cooling portion 21a.

In an upstream portion of the cooling return line 21 (upstream of the stator cooling portion 21a in the shown example), a relief valve 33 for controlling the amount of oil that flows from the high pressure line 19 into the cooling return line 21 is provided. The amount of the oil OL that is returned from the high pressure line 19 to the upstream side of the deaerator 25 in the lubrication line 13 is controlled by adjusting the aperture of the relief valve 33, whereby rise in the temperature of the oil OL is facilitated when the oil OL is at a low temperature and has poor fluidity, and the oil OL from which air is removed can be stably supplied to the hydraulic control section H even in the transitional period when the gravity-free state occurs.

Further, a warming-up line 37 having a relief valve 35 is provided for warming up the oil OL under a low temperature condition. The warming-up line 37 branches from a portion of the cooling return line 21 between the relief valve 33 and the stator cooling portion 21a, and is connected to a portion of the lubrication line 13 between the oil cooler 23 and the deaerator 25. In other words, the warming-up line 37 bypasses the oil cooler 23 in the lubrication line 13, and is connected to the upstream side of the deaerator 25.

Next, the operation of the hydraulic circuit C thus configured will be described. The oil OL supplied from the first main tank 3 to the lubrication line 13 in the normal state is cooled by the oil cooler 23. The cooled oil OL flows into the deaerator 25, and is deaerated by the deaerator 25. Thereafter, a portion of the oil OL, serving as a lubricating oil, lubricates the lubrication target 2. The other portion of the oil OL that has flowed into the deaerator 25 is temporarily stored in the auxiliary tank 27, and thereafter, is supplied to the high pressure line 19. The auxiliary tank 27 may be omitted. However, by providing the auxiliary tank 27, shortage of the oil required for control of the hydraulic control section H is assuredly avoided, whereby the hydraulic control section H can be stably operated.

A portion of the oil OL supplied to the high pressure line 19 is supplied to the hydraulic control section H through the high pressure pump 15, while the other portion thereof, which is not used in the hydraulic control section H, flows into the cooling return line 21. The oil OL that has flowed into the cooling return line 21 cools the stator S of the generator GE while passing through the stator cooling portion 21a, and thereafter, is returned to the upstream side of the oil cooler 23 in the lubrication line 13 and again supplied to the oil cooler 23 with the lubrication pump 11. Therefore, it is possible to efficiently cool the generator GE by reusing the oil OL returned from the cooling return line 21.

As described above, according to the hydraulic circuit C of the present embodiment, the line for returning the oil OL to the lubrication line 13 is configured as the cooling return line 21 to be used also for cooling the generator GE, and thereafter, the oil is returned to the downstream side of the lubrication pump 11, whereby the total amount of required oil is reduced, and thus the pump capacity is reduced. Moreover, since the generator GE is cooled by using the oil OL in the high pressure line 19, the pressure loss of the lubrication line 13 is reduced as compared to the case of cooling the generator GE with the oil OL in the low-pressure lubrication line 13, and thus useless work of the lubrication pump 11 is reduced. Therefore, the efficiency of the IDG is significantly increased.

Figure 3:
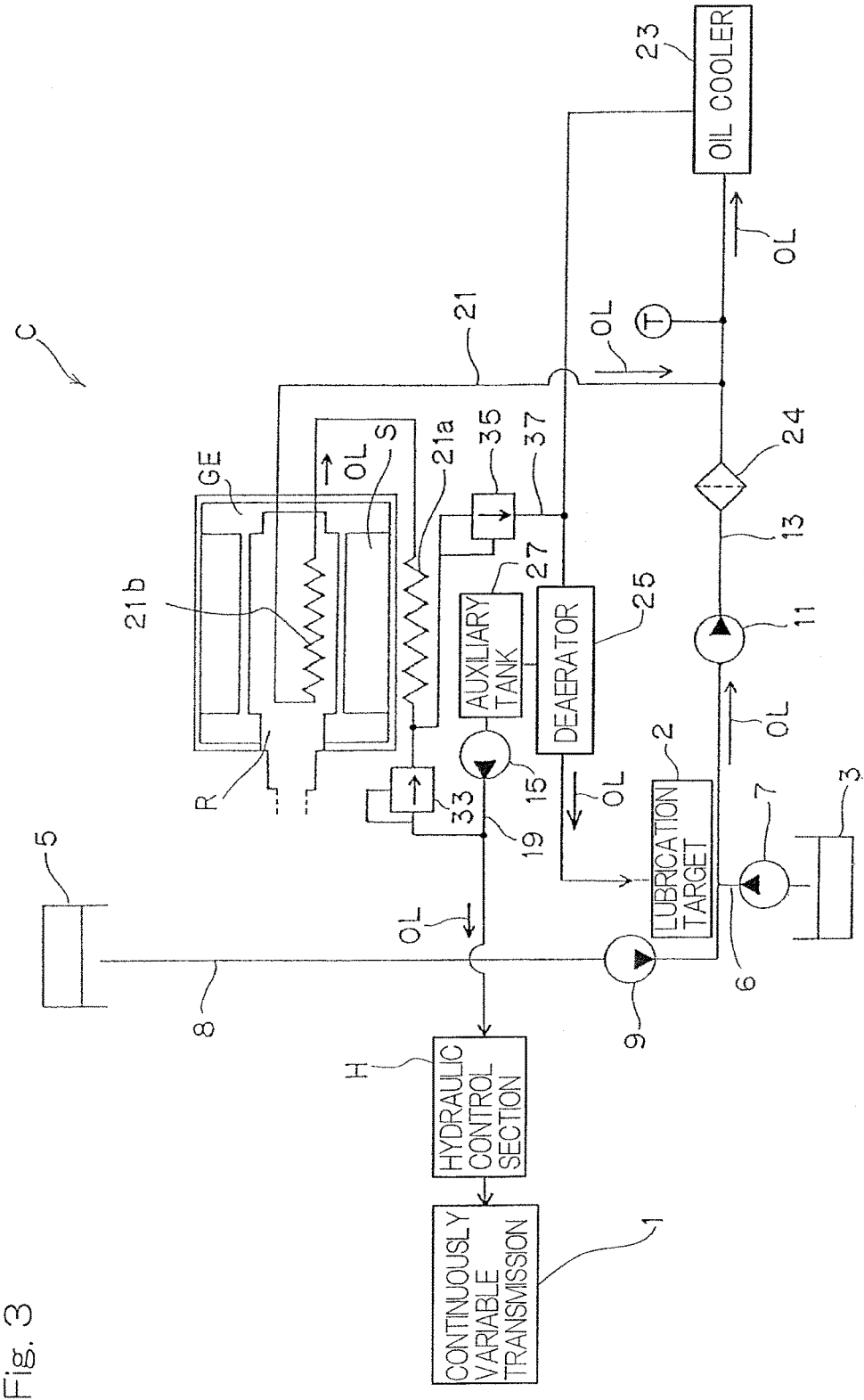
FIG. 3 is a block diagram showing a schematic configuration of a hydraulic circuit according to a second embodiment of the present invention.

Next, a hydraulic circuit C according to a second embodiment of the present invention shown in FIG. 3 will be described. In this embodiment, the rotor cooling line 26 provided so as to branch from the lubrication line 13 in the first embodiment shown in FIG. 1 is omitted, and instead of the rotor cooling line 26, the cooling return line 21 cools not only the stator S of the generator GE but also the rotor R thereof, as shown in FIG. 3. The other components are the same as those of the first embodiment as shown in FIG. 3, and detailed description thereof will be omitted.

Specifically, the cooling return line 21 of the present embodiment passes in the periphery of the stator S of the generator GE and further passes through the rotor R, and then is connected to a portion of the lubrication line 13 between the lubrication pump 11 and the oil cooler 23. In other words, a portion of the cooling return line 21 forms the above-mentioned stator cooling portion 21a, while the other portion of the cooling return line 21b forms a rotor cooling portion 21b as a cooling path to cool the rotor R of the generator GE. The manner in which the rotor cooling portion 21b passes through the rotor R is the same as the manner in which the rotor cooling line 26 passes through the rotor R, described with reference to FIG. 2. The cooling return line 21 may be configured to cool the stator S after cooling the rotor R.

According to the hydraulic circuit C of the present embodiment, not only the stator S of the generator GE but also the rotor R thereof are cooled by using the oil OL flowing in the high pressure line 19. Therefore, the amount of required oil can be further reduced, and thereby the pump capacity can be reduced. As a result, the efficiency of the IDG is further increased.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Continuously variable transmission
2 . . . Lubrication target
3 . . . First main tank (Oil tank)
5 . . . Second main tank (Oil tank)
11 . . . Lubrication pump
13 . . . Lubrication line
15 . . . High pressure pump
19 . . . High pressure line
21 . . . Cooling return line
21a . . . Stator cooling portion (Cooling path)
21b . . . Rotor cooling portion (Cooling path)
23 . . . Oil cooler
27 . . . Auxiliary tank
C . . . Hydraulic circuit
GE . . . Generator
H . . . Hydraulic control section
OL . . . Oil
R . . . Rotor
S . . . Stator

What is claimed is:

1. A hydraulic circuit used for control of a continuously variable transmission, comprising:
    a lubrication line provided with a lubrication pump, and configured to supply oil from an oil tank to a lubrication target by using the lubrication pump;
    a high pressure line provided with a high pressure pump, branching from the lubrication line, and configured to supply, by using the high pressure pump, high-pressure oil to a hydraulic control section that controls oil pressure of the oil to be supplied to the continuously variable transmission; and
    a cooling return line branching from the high pressure line, and configured to return the oil to a downstream side of the lubrication pump in the lubrication line, a portion of the cooling return line forming a cooling path to cool a generator connected to the continuously variable transmission.

2. The hydraulic circuit as claimed in claim 1, wherein the portion of the cooling return line forms a cooling path to cool a stator of the generator.

3. The hydraulic circuit as claimed in claim 2, wherein another portion of the cooling return line forms a cooling path to cool a rotor of the generator.

4. The hydraulic circuit as claimed in claim 1, wherein the cooling return line is connected to the lubrication line on an upstream side of an oil cooler.

5. The hydraulic circuit as claimed in in claim 1, further comprising an auxiliary tank provided on an upstream side of the high pressure pump in the high pressure line, and configured to compensate for shortage of oil amount in the high pressure line.

\* \* \* \* \*